United States Patent
Lei

(10) Patent No.: US 9,311,571 B2
(45) Date of Patent: Apr. 12, 2016

(54) ELECTRONIC CARD CONNECTOR AND ELECTRONIC DEVICE USING SAME

(71) Applicant: ScienBiziP Consulting (Shen Zhen) Co., Ltd., Shenzhen (CN)

(72) Inventor: Qian Lei, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/566,897

(22) Filed: Dec. 11, 2014

(65) Prior Publication Data

US 2015/0171552 A1   Jun. 18, 2015

(30) Foreign Application Priority Data

Dec. 13, 2013   (CN) .......................... 2013 1 0678111

(51) Int. Cl.
*H01R 13/62* (2006.01)
*G06K 13/08* (2006.01)

(52) U.S. Cl.
CPC ........ *G06K 13/0831* (2013.01); *G06K 13/0812* (2013.01)

(58) Field of Classification Search
CPC .... H01R 13/633; H01R 13/635; H01R 13/62; G06K 13/08; G06K 13/0806
USPC ........................................... 439/152, 159, 160
See application file for complete search history.

(56) References Cited

U.S. PATENT DOCUMENTS

| | | | | |
|---|---|---|---|---|
| 7,427,206 B2* | 9/2008 | Takei | ................. | G06K 13/0831 439/159 |
| 8,491,320 B2* | 7/2013 | Zhang | .................... | G06K 13/08 439/159 |
| 8,767,381 B2* | 7/2014 | Shukla | .................. | G06F 1/1658 361/679.01 |
| 8,960,818 B2* | 2/2015 | Myers | ........................ | 312/319.2 |
| 9,164,539 B2* | 10/2015 | Wu | ........................ | G06F 1/1613 |

* cited by examiner

*Primary Examiner* — Hien Vu
(74) *Attorney, Agent, or Firm* — Novak Druce Connolly Bove + Quigg LLP

(57) ABSTRACT

An electronic device includes a housing and an electronic card connector. The peripheral sidewall defines a through hole. The electronic card connector includes a tray, a fixing member, a push rod and a connecting rod. The tray defines a defined space for receiving an electronic card and at least one notch. The fixing member includes at least one elastic arm having a hook. The push rod partially passes through the through hole and protrudes from of the housing. The at least one connecting rod connects the second end to the at least one elastic arm. When the at least one hook engages with the at least one notch, the tray is engaged with the housing, and when the push rod is driven to disengage the at least one hook from the at least one notch, the tray is disengaged from the housing.

16 Claims, 6 Drawing Sheets

ELECTRONIC CARD CONNECTOR AND ELECTRONIC DEVICE USING SAME

FIELD

The subject matter herein generally relates to an electronic card connector and an electronic device using same.

BACKGROUND

Electronic card connectors, such as Subscriber Identity Model cards (SIM card), Secure Digital Memory cards (SD card) or like can be inserted into an electronic device, so that the electronic device can communicate or store information.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
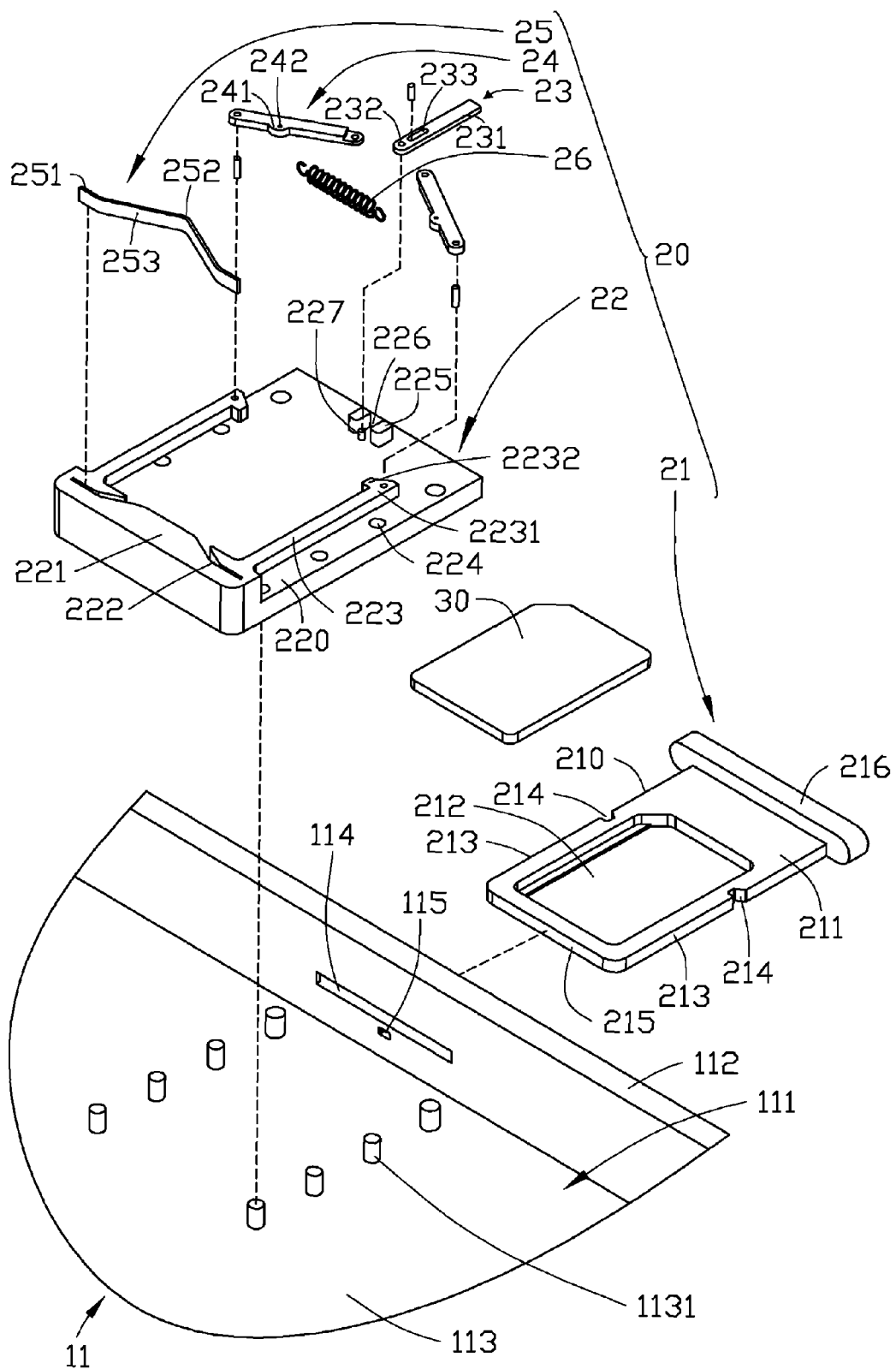
FIG. 1 is an exploded isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
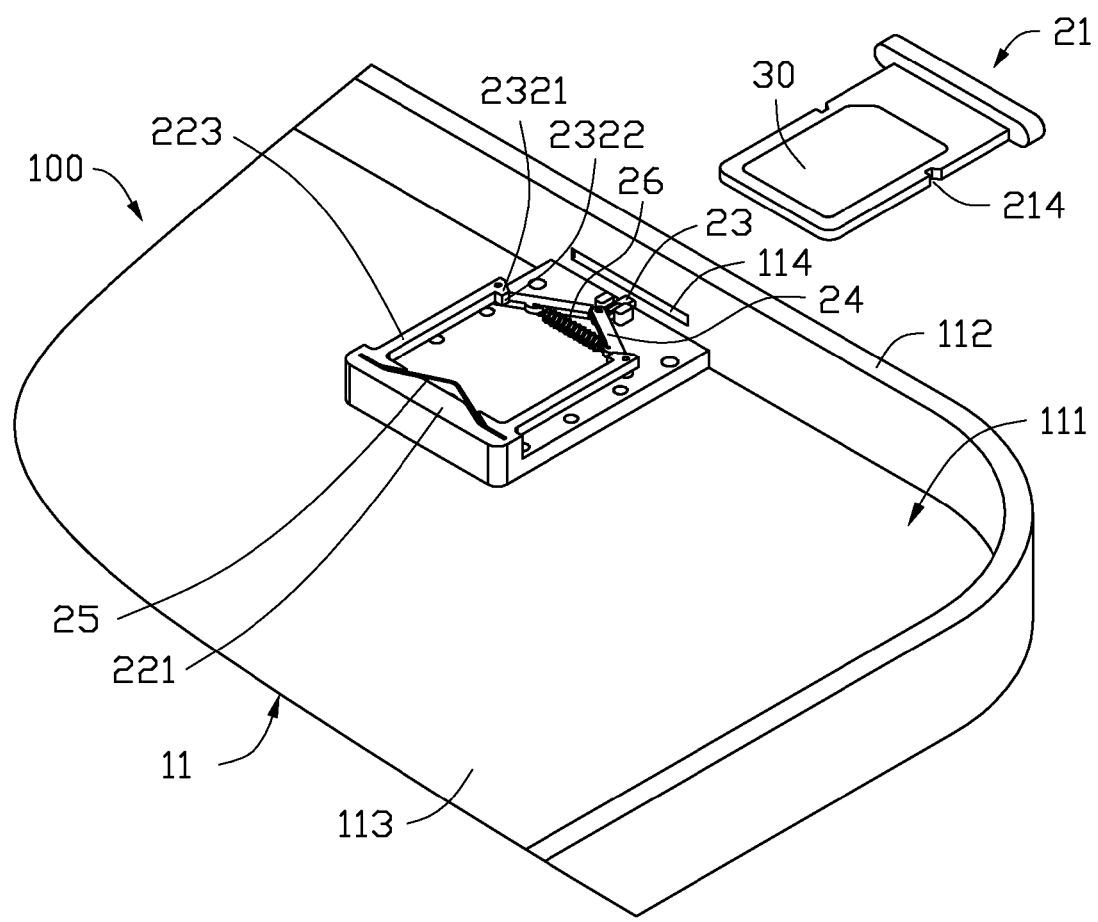
FIG. 2 is a partially assembled isometric view of the electronic device shown in FIG. 1.

FIGS. 1 and 2 show an electronic device 100. The electronic device 100 can include a housing 11 and an electronic card connector 20. The electronic device 100 can also include other functional modules to fulfill different functions; however, it is not shown and specifically described for simplification.

The housing 11 can include a peripheral sidewall 112, a bottom 113 and other peripheral sidewalls (not shown). The peripheral sidewall 112, the bottom 113 and the other peripheral sidewalls can cooperatively define a receiving space 111. The receiving space 111 can be used for receiving the electronic card connector 20.

The peripheral sidewall 112 defines an opening 114 and a through hole 115 located below the opening 114.

The electronic card connector 20 can include a tray 21 and a fixing member 22.

The tray 21 can be rectangular-shaped. The tray 21 can include a tray body 210 and a shoulder 216 located on one end of the tray body 210. When in assembly, the tray body 210 can pass through the opening 114 and receive in the receiving space 111, and the shoulder 216 can accommodate in the opening 114.

The tray body 210 can have a first upper surface 211. The tray body 210 can further define a defined space 212 on the first upper surface 211. The defined space 212 can be used for receiving an electronic card 30.

The tray body 210 can further have a sidewall 213. The tray body 210 can further define a notch 214 on the sidewall 213. The tray body 210 can further have an end 215 opposite to the shoulder 216.

In this embodiment, the tray body 210 can further have two sidewalls 213. The tray body 210 can define two notches 214 on the two parallel sidewalls 213.

The fixing member 22 can be fixed to the bottom 113 and resist the peripheral sidewall 112. The fixing member 22 can include a bottom wall 220 and a limited wall 221 protruding from one end of the bottom wall 220 away from the peripheral sidewall 112. The limited wall 221 defines a slot 222 on one side of the limited wall 221 facing the peripheral sidewall 112 and further protrudes at least one elastic arm 223 from the side of the limited wall 221 and extends towards the peripheral sidewall 112. The elastic arm 223 can have a free end 2231. The elastic arm 223 can further define a hook 2232 on the free end 2231. The hook 2232 can accommodate in the notch 214.

In this embodiment, the limited wall 221 protrudes two elastic arms 223 on the side of the limited wall 221 and extends towards the peripheral sidewall 112. The two elastic arms 223 can be located on the two side of the slot 222. Each elastic arm 223 can have a free end 2231. Each elastic arm 223 can further define a hook 2232 on the free end 2231. The two hooks 2232 can face with each other. Each hook 2232 can accommodate in one of the two notches 214.

The bottom wall 220 of the fixing member 22 can further define a number of first receiving holes 224. The first receiving holes 224 can face the bottom 113. The housing 11 can include a number of protrusions 1131 protruded from the bottom 113. Each protrusion 1131 can be received in one of the first receiving holes 224 to engage the fixing member 22 with the housing 11.

In at least one embodiment, the fixing member 22 can be fixed to the bottom 113 by glue, screws, or any other suitable way.

The fixing member 22 can define a slide groove 226. The extension direction of the slide groove 226 can be substantially perpendicular to the peripheral sidewall 112. In this embodiment, the fixing member 22 can further include two first limited posts 225 protruding from the bottom wall 220. The slide groove 226 can be formed by two first limited posts 225.

The fixing member 22 can further include a second limited post 227 protruding from the bottom wall 220. The second limited post 227 can be located on one side of the two first limited posts 225 away from the peripheral sidewall 112.

The electronic card connector 20 can further include a push rod 23, at least one connecting rod 24, an elastic member 25 and a return member 26.

The push rod 23 can include a first end 231 and a second end 232 opposite to the first end 231. The push rod 23 can define a spacing hole 233 thereon. The spacing hole 233 can be substantially rectangular-shaped. The length of the spacing hole 233 can be greater than both the width of the spacing hole 233 and the outside diameter of the second limited post 227. The second limited post 227 can pass through the spacing hole 233 and slide therein with the guide of the spacing hole 233. The push rod 23 can pass through the slide groove 226 and the first end 231 of the push rod 23 can pass through the opening 214 and protrude from the housing 11.

The connecting rod 24 can connect the second end 232 of the push rod 23 to the free end 2231 of the elastic arm 223. In this embodiment, the electronic card connector 20 can include two connecting rods 24. The one ends of the two connecting rods 24 close to the peripheral sidewall 112 can simultaneously connect to the second end 232 of the push rod 23. The other ends of the two connecting rods 24 away from the peripheral sidewall 112 can connect to the two free ends 2231 of the elastic arm 223 respectively.

Figure 3:
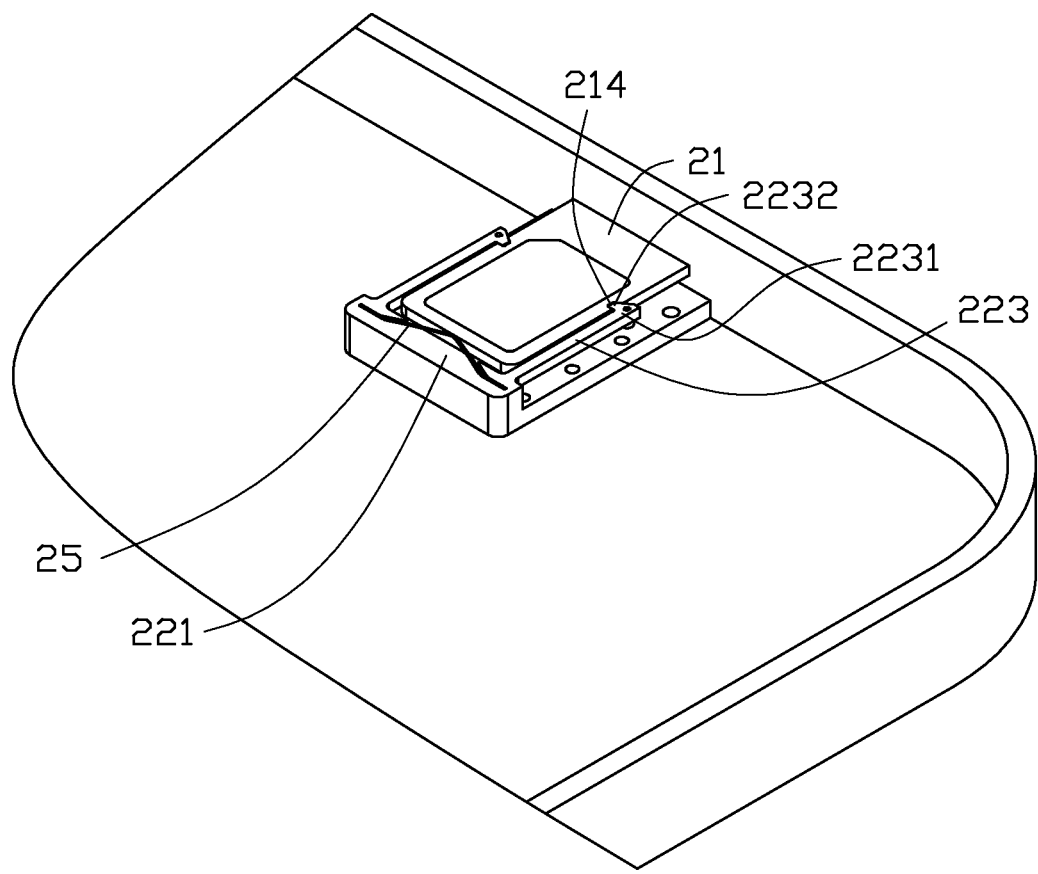
FIG. 3 is an assembled isometric view of the electronic device shown in FIG. 1.
Figure 4:
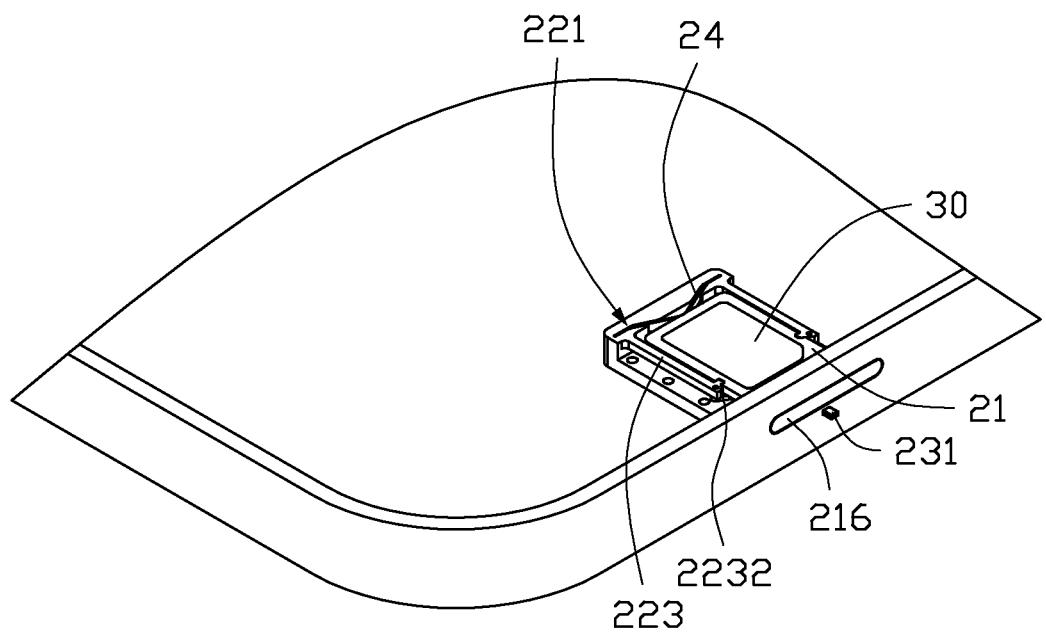
FIG. 4 is an assembled isometric view of the electronic device shown in FIG. 1 viewed from another direction.

The elastic member 25 can be substantially arc-shaped. Referring to FIGS. 3 and 4, the elastic member 25 can be located between the limited wall 221 and the end 215 of the tray body 210. In this embodiment, referring to FIGS. 1 and 2, the elastic member 25 can have a fixing portion 251, a resisting portion 252 and a connecting portion 253 connecting the fixing portion 251 to the resisting portion 252. The fixing portion 251 can receive in the slot 222. The resisting portion 252 can resist the end 215 of the tray body 210. In at least one embodiment, the elastic member 25 can be fixed to the fixing member 22 directly.

The return member 26 can connect the two connecting rods 24. In this embodiment, the return member 26 can be a spring. Each connecting rod 24 can include a lug 241 protruded therefrom. The two lugs 241 can face with each other. Each lug 241 can define a second receiving hole 242. One end of the return member 26 can connect to one lug 241 and the other end of the return member 26 can connect to the other lug 241 so as to connect the two connecting rods 24.

Figure 5:
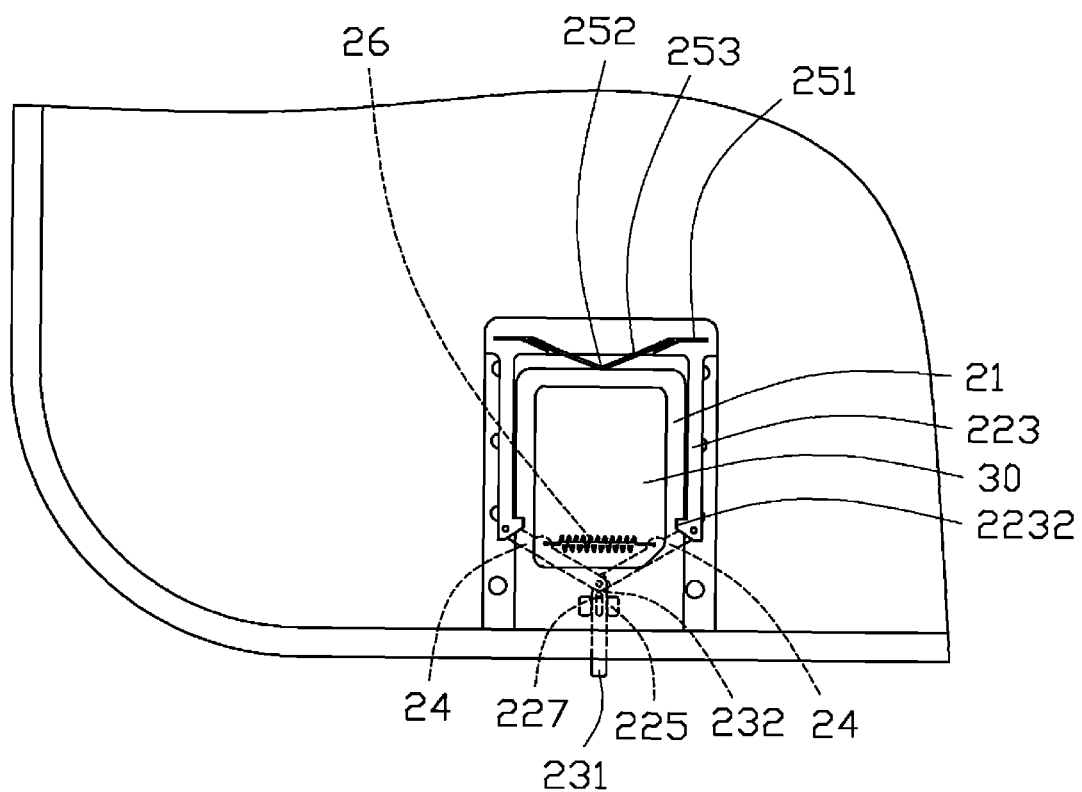
FIG. 5 is a first state top plan view of the electronic device shown in FIG. 1.

Referring to FIG. 5, when in assembly, the fixing member 22 can be fixed to the bottom 113 of the housing 11 by each protrusion 1131 receiving in one of the first receiving holes 224; the push rod 23 can be pushed to pass through the slide groove 226, the second limited post 227 can thus receive in the spacing hole 233, the first end 231 of the push rod 23 can be pushed to pass through the opening 114, and the second end 232 can connect one end of each connecting rod 24 close to the peripheral sidewall 112; the other end of each connecting rod 24 away from the peripheral sidewall 112 can connect to one of the two free ends 2231; the fixing portion 251 of the elastic member 25 can be fixed to the slot 222 and the resisting portion 252 of the elastic member 25 can protrude from the limited wall 221; the return member 26 can be connected between the two lugs 241; the tray body 210 can be pushed to pass through the opening 114 to receive in the receiving space 111 and resist the resisting portion 252 of the elastic member 25; and the two hooks 2232 of the elastic member 223 can be received in the two notches 214 respectively thus to engage the tray 21 with the housing 11.

Figure 6:
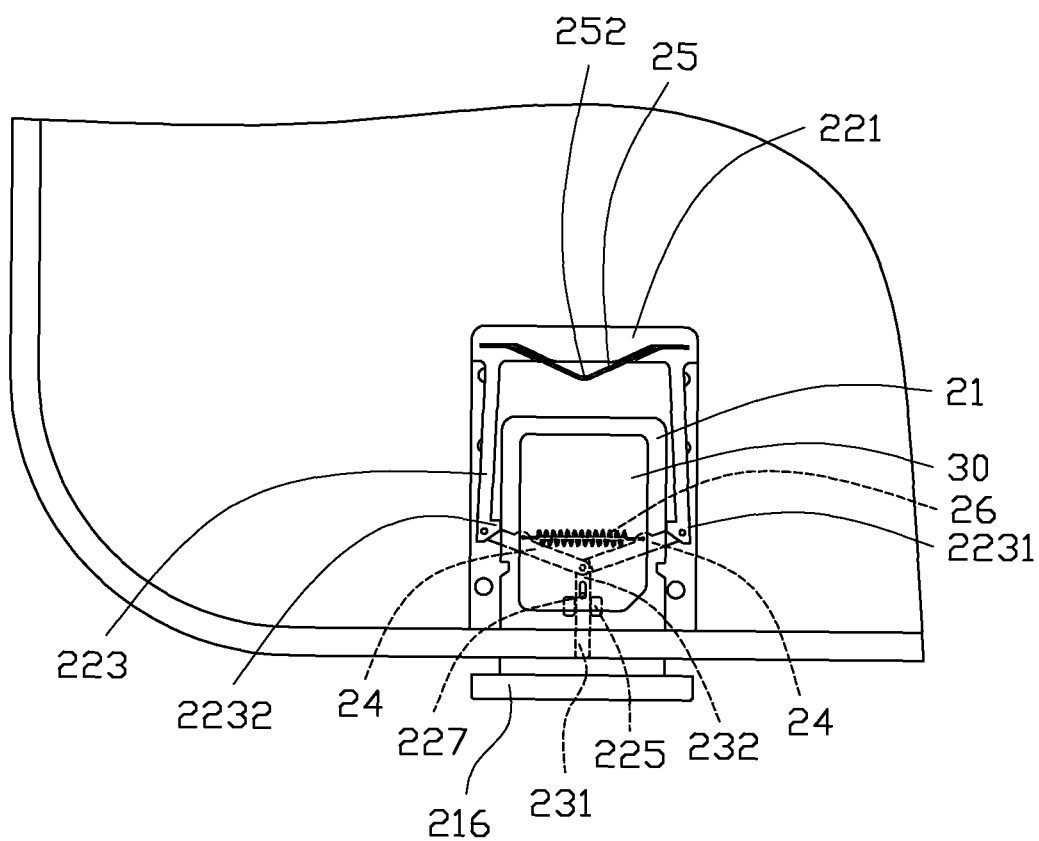
FIG. 6 is a second state top plan view of the electronic device shown in FIG. 1.

Referring to FIG. 6, when in a locked state, the first end 231 can be protruded from the housing 11, the second limited post 227 can be located on one end of the spacing hole 233 away from the peripheral sidewall 112, the two elastic arms 223 can be substantially parallel with each other, the two hooks 2232 can be received in the two notches 214 respectively, and the elastic member 25 can be compressed.

If one wants to take out the electronic card 30 from the defined space 212 or put a new electronic card in the defined space 212, an external force can be applied on the first end 231 to push the push rod 23 to move towards the interior of the housing 11. The two connecting rods 24 can be thus pushed to move towards a direction away from the peripheral sidewall 112. The two free ends 2231 can be thus pushed to move away from each other. The return member 26 can be stretched. What the result of movement of the two free ends 2231 can be that the two hooks 2232 disengage from the notches 214 respectively. The elastic restoring force of the elastic member 25 can push the tray 21 to move towards a direction close to the peripheral sidewall 112 until the tray 21 protrudes from the opening 114. At this moment, the electronic card 30 can be taken out from the defined space 212 or the new electronic card can be put in the defined space 212. After this, when there is no external force applied on the first end 231, the elastic restoring force of the return member 26 can pull the two connecting rods 24 to move towards each other until the second limited post 227 can be located on one end of the spacing hole 233 away from the peripheral sidewall 112 again.

In at least one embodiment, the electronic card 30 can be SIM (Subscriber Identity Module) card, SD (Secure Digital) card or other suitable card.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a housing comprising a bottom wall and a peripheral sidewall, the bottom wall and the peripheral sidewall defining a receiving space, the peripheral sidewall defining an opening and a through hole; and
an electronic card connector comprising:
a tray defining a defined space for receiving an electronic card and at least one notch, the tray passing through the opening and being received in the receiving space; and
a fixing member attached to the bottom, the fixing member comprising at least one elastic arm protruding therefrom, each elastic arm comprising a hook;
a push rod having a first end and a second end opposite to the first end, the first end passing through the through hole and protruding outwardly from the housing; and
at least one connecting rod connecting to the second end of the push rod and being connected to the hook,
the electronic card connector configured such that when the at least one hook engages with the at least one notch, the tray is engaged with the peripheral sidewall of the housing, and when the push rod is driven to disengage the at least one hook from the at least one notch, the tray is disengaged from the peripheral sidewall of the housing;

wherein the fixing member comprises a limited wall protruding from the bottom wall and facing the peripheral sidewall, and the at least one elastic arm is protruded from the limited wall and extending towards the peripheral sidewall; and wherein the electronic card connector further comprises an elastic member located between the limited wall and the tray.

2. The electronic device of claim 1, wherein the elastic member has a fixing portion, a resisting portion and a connecting portion connecting the fixing portion to the resisting portion, the fixing portion is fixed to the fixing member, and the resisting portion resists the tray.

3. The electronic device of claim 2, wherein the limited wall defines a slot thereon, and the fixing portion receives the slot to fix the elastic member on the limited wall.

4. The electronic device of claim 1, wherein the electronic card connector comprises two connecting rods, the fixing member comprises two elastic arms protruding from the first limited wall, one end of each connecting rod close to the peripheral sidewall is connected to the second end of the push rod, and the other end of each connecting rod away from the peripheral sidewall is connected to one of the two elastic arms.

5. The electronic device of claim 4, wherein the electronic card connector comprises a return member, the return member connects the two connecting rods, and the two connecting rods are driven to move towards each other by an elastic restoring force of the return member.

6. The electronic device of claim 5, wherein each connecting rod comprises a lug protruded therefrom, and the two lugs are connected by the return member.

7. The electronic device of claim 1, wherein the fixing member defines a slide groove, an extension direction of the slide groove is perpendicular to the peripheral sidewall, and the push rod passes through the slide groove and slide therein with guide of the slide groove.

8. The electronic device of claim 7, wherein the fixing member comprises two first limited posts protruding from the bottom, and the slide groove is formed by the two first limited posts.

9. The electronic device of claim 1, wherein the fixing member further comprises a second limited post protruding from the bottom, the push rod defines a spacing hole thereon, and the second limited post passes through the spacing hole and slides in the spacing hole so as to guide movement of the second limited post.

10. An electronic card connector, applied to an electronic device, the electronic device comprising:
a housing, the housing comprising a bottom wall and a peripheral sidewall, the bottom wall and the peripheral sidewall defining a receiving space, the peripheral sidewall defining an opening and a through hole, the electronic card connector comprising:
a tray defining a defined space for receiving an electronic card and at least one notch, the tray passing through the opening and being received in the receiving space; and
a fixing member attached to the bottom, the fixing member comprising at least one elastic arm protruding therefrom, each elastic arm comprising a hook;
a push rod having a first end and a second end opposite to the first end, the first end passing through the through hole and protruding outwardly from the housing; and
at least one connecting rod connecting to the second end of the push rod and being connected to the hook;
the electronic card connector configured such that when the at least one hook engages with the at least one notch, the tray is engaged with the peripheral sidewall of the housing, and when the push rod is driven to disengage the at least one hook from the at least one notch, the tray is disengaged from the peripheral sidewall of the housing;
wherein the fixing member comprises a limited wall protruding from the bottom wall and facing the peripheral sidewall, and the at least one elastic arm is protruded from the limited wall and extending towards the peripheral sidewall; and
wherein the electronic card connector further comprises an elastic member located between the limited wall and the tray.

11. The electronic card connector of claim 10, wherein the elastic member has a fixing portion, a resisting portion and a connecting portion connecting the fixing portion to the resisting portion, the fixing portion is fixed to the fixing member, and the resisting portion resists the tray.

12. The electronic card connector of claim 11, wherein the limited wall defines a slot thereon, the fixing portion receives in the slot to fix the elastic member to the limited wall.

13. The electronic card connector of claim 10, wherein the fixing member comprises a limited post protruding from the bottom wall, the push rod defines a spacing hole thereon, and the limited post passes through the spacing hole and slides in the spacing hole so as to guide movement of the push rod.

14. The electronic card connector of claim 10, wherein the electronic card connector comprises two connecting rods, the fixing member comprises two elastic arms protruding therefrom, one end of each connecting rod close to the peripheral sidewall is connected to the second end of the push rod, and the other end of each connecting rod away from the peripheral sidewall is connected to one of the two elastic arms.

15. The electronic card connector of claim 14, wherein the electronic card connector comprises a return member, the return member connects the two connecting rods, and the two connecting rods are driven to move towards each other by an elastic restoring force of the return member.

16. The electronic card connector of claim 10, wherein the fixing member defines a slide groove, an extension direction of the slide groove is perpendicular to the peripheral sidewall, the push rod passes through the slide groove and slides therein with guide of the slide groove.

* * * * *